(12) United States Patent
Felstaine et al.

(10) Patent No.: US 9,749,218 B1
(45) Date of Patent: Aug. 29, 2017

(54) SYSTEM, METHOD, AND COMPUTER PROGRAM FOR ROUTING TRAFFIC TO A SERVICE IN A NETWORK INCLUDING AT LEAST ONE VIRTUAL NETWORK SERVICE

(71) Applicant: Amdocs Software Systems Limited, Dublin (IE)

(72) Inventors: Eyal Felstaine, Hertzeliya (IL); Itzik Kitroser, Beer Sheva (IL); Ofer Hermoni, Yavne (IL); Shmuel Ur, Shorashim (IL)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 325 days.

(21) Appl. No.: 14/538,754

(22) Filed: Nov. 11, 2014

(51) Int. Cl.
*H04L 12/26* (2006.01)
*H04L 12/721* (2013.01)

(52) U.S. Cl.
CPC .................. *H04L 45/124* (2013.01)

(58) Field of Classification Search
CPC ....................................... H04L 45/00

USPC ......................................... 370/238
See application file for complete search history.

(56) References Cited

U.S. PATENT DOCUMENTS

2016/0173338 A1* 6/2016 Wolting ................ H04L 41/145
709/223

* cited by examiner

*Primary Examiner* — Christopher R Crompton
(74) *Attorney, Agent, or Firm* — Zilka-Kotab, PC

(57) ABSTRACT

A system, method, and computer program product are provided for routing traffic to a service in a network including at least one virtual network service. In use, data traffic directed to at least one first component in a network system is received. Further, one or more second components capable of handling the data traffic are identified based on information associated with the data traffic, the one or more second components including one or more virtual services or one or more physical services. Additionally, at least one of the one or more second components is selected to receive the data traffic, based on criteria associated with the at least one of the one or more second components and the information associated with the data traffic. Moreover, the data traffic is sent to the at least one of the one or more second components.

20 Claims, 8 Drawing Sheets

SYSTEM, METHOD, AND COMPUTER PROGRAM FOR ROUTING TRAFFIC TO A SERVICE IN A NETWORK INCLUDING AT LEAST ONE VIRTUAL NETWORK SERVICE

FIELD OF THE INVENTION

The present invention relates to telecommunications and/or data communications and, more particularly to network function virtualization (NFV) of telecommunications networks.

BACKGROUND

Network Function Virtualization is a term or a name of a proposed architecture of telecom services as published by the European Telecommunications Standards Institute (ETSI) in a series of documents available from the ETSI website. NFV uses generic hardware platform and software adapted for the generic hardware platform. Thus, NFV creates a network much more flexible and dynamic than a legacy communication network. In NFV-based networks, a Virtual Network Function (VNF) decouples the software implementation of the network function from the infrastructure resources it runs on by virtualization. A network service is based on one or more VNFs and/or Physical Network Functions (PNFs), their interconnections, and chaining definitions. The VNFs can be executed on almost any generic hardware processing facility. Therefore, VNFs may be installed, removed, and moved between hardware facilities, much more easily, less costly and thus, more frequently.

The flexibility of the NFV-based network enhances the means available for optimizing the network's capacity and performance. However, currently there are not available techniques for routing traffic to specific services, based on a content of the traffic.

There is thus a need for addressing these and/or other issues associated with the prior art.

SUMMARY

A system, method, and computer program product are provided for routing traffic to a service in a network including at least one virtual network service. In use, data traffic directed to at least one first component in a network system is received. Further, one or more second components capable of handling the data traffic are identified based on information associated with the data traffic, the one or more second components including one or more virtual services or one or more physical services. Additionally, at least one of the one or more second components is selected to receive the data traffic, based on criteria associated with the at least one of the one or more second components and the information associated with the data traffic. Moreover, the data traffic is sent to the at least one of the one or more second components.

DETAILED DESCRIPTION

Figure 1:
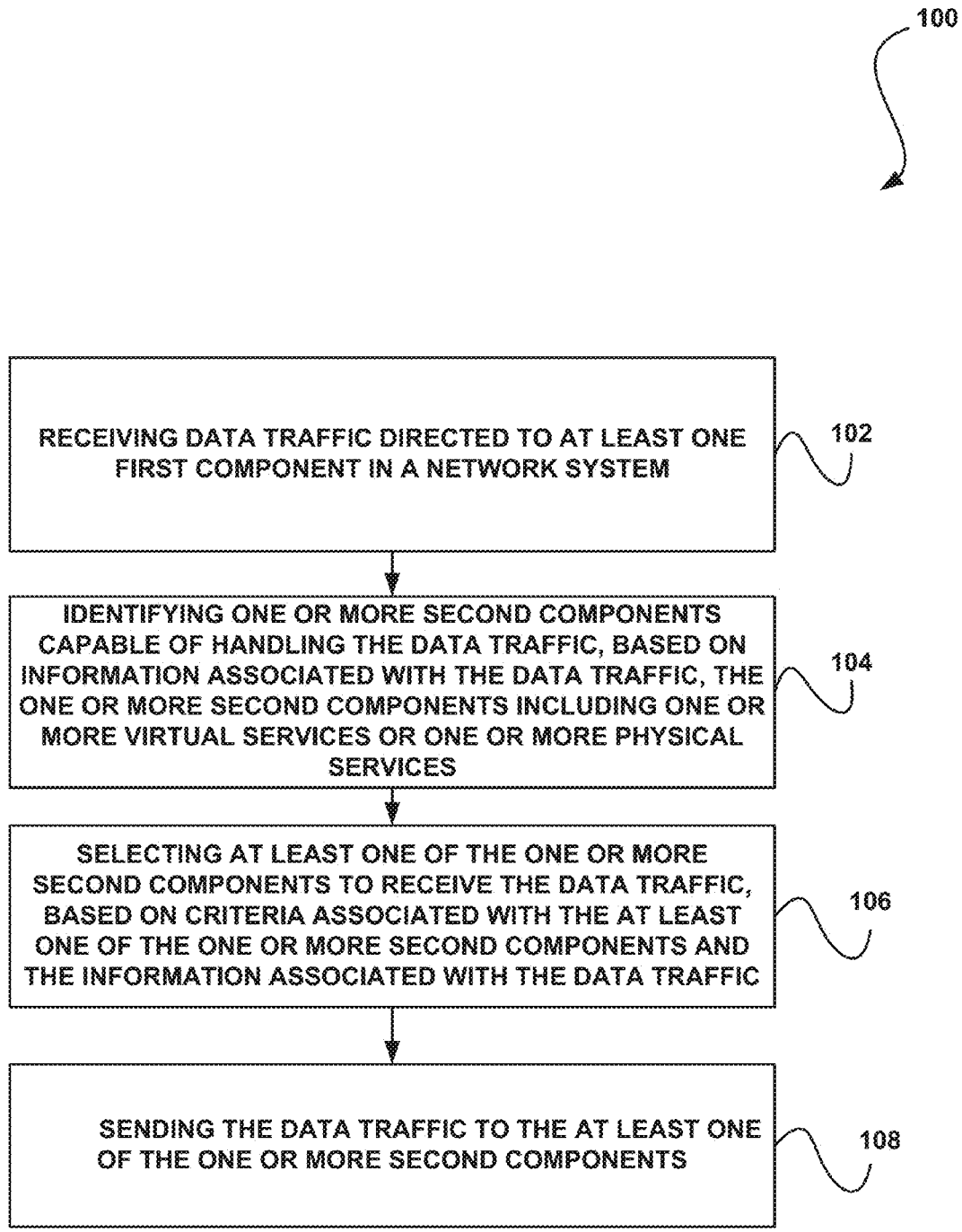
FIG. 1 illustrates a method for routing traffic to a service in a network including at least one virtual network service, in accordance with one embodiment.

FIG. 1 illustrates a method 100 for routing traffic to a service in a network including at least one virtual network service, in accordance with one embodiment.

As shown, data traffic directed to at least one first component in a network system is received. See operation 102. The component may include a physical component (e.g. a physical network service, etc.) and/or a virtual network service. In one embodiment, the data traffic may be received by a service specific management module that may include one or more virtual network functions.

Moreover, the network system may include any type of system with various physical network components and/or virtual network components. For example, the network system may include an NFV-based network, a physical network, or a hybrid physical/NFV-based network.

Further, one or more second components capable of handling the data traffic are identified based on information associated with the data traffic, the one or more second components including one or more virtual services and/or one or more physical services. See operation 104. The one or more second components capable of handling the data traffic may include physical components and/or virtual network services.

The information associated with the traffic may include any information, such as content type, origin information, destination information, the content itself, and/or various other information. For example, the data traffic content may be analyzed to identify the components capable of handling the data traffic.

Additionally, at least one of the one or more second components is selected to receive the data traffic, based on criteria associated with the at least one of the one or more second components and the information associated with the data traffic. See operation 106. The component selected to receive the traffic may include a virtual network service/component and/or a physical network component/service.

Furthermore, the selection of the component to receive the traffic may be based on any criteria associated with the component. For example, the selection of the component/service to receive the data traffic may be based on a monetary cost. In this case, the monetary cost may include a cost of utilizing the service, activating the service, processing data using the service, and/or various other costs.

As another example, the selection of the component/service to receive the data traffic may be based on a processing cost. The processing cost may be associated with an amount of effort/work required by the component/service to process the data. Of course, any number of other factors may be considered, such as criteria associated with a service level agreement (SLA) or jitter associated with the components, etc. In one embodiment, the selection of the component to receive the data traffic may be based on a weighted combination of multiple criteria associated with the available components.

Additionally, in one embodiment, a routing table may be utilized to select the component to receive the data traffic. In this case, the routing table may include the components capable of handling the data traffic and the routing table may correlate a plurality of possible input types to each of the components capable of handling the data traffic. As an option, the component that correlates to an input type associated with the data traffic may be selected to receive the data traffic.

Furthermore, in one embodiment, a cost table may be utilized to generate the routing table. In this case, the cost table may correlate criteria associated with each of the potential components to the components. As an example, the criteria associated with each of the components may include a cost per unit and/or a processing time, etc.

As shown further in FIG. 1, the data traffic is sent to the at least one of the one or more second components. See operation 108. In one embodiment, the method 100 may be implemented utilizing one or more virtual network functions or features (VNFs). For example, sending the data traffic to the at least one of the one or more second components may include routing the data traffic utilizing at least one VNF Utilizing the method 100, in on embodiment, a service specific manager may be employed in a system that chooses or auctions which service to apply to a specific request, among multiple possible cloud and physical service instances, based on different criteria such as usage, time, and communication costs.

In the context of the present description, the terms "network" and "communication network" refer to the hardware and software connecting one or more communication elements including wireline networks, wireless networks, and/or combinations thereof.

The terms "network function virtualization" (NFV) and virtual network function (NFV) are described in a series of documents published by the European Telecommunications Standards Institute (ETSI) and available from the ETSI website. The term "virtual network function or feature" (VNF) refers to a particular implementation of a function, a feature, or a service provided by the network, internally within the network, or externally to a customer, subscriber, end-user, a terminal or a server. A VNF may include the software program implementation of the function or feature or service. The term VNF instance (VNF-I) refers to a particular process or task executing the VNF program by a particular virtual machine or processor or computing facility and/or used by a particular customer (or subscriber, end-user, terminal or server, etc.).

The term "service" refers to any type of use (such as a use case) that a NFV-based communication network may offer or provide to one or more communication elements. A service may include switching data or content between any number of elements, providing content from a server to a communication element or between servers, securing and protecting communication and content, processing content provided by the customer or by a third party, providing backup and redundancy, etc. A service may be using partial functionality of a VNF or may include one or more VNFs and/or one or more VNF instances forming a service sub-network (or interconnection model). In the context of the present description, the term "chain" may refer to such service sub-network, such as a particular plurality of VNFs and/or VNF instances associated with a particular service type or a service instance.

The term "deployment", when referring to hardware elements, including processing elements, memory elements, storage elements, connectivity (communication) elements, etc., refer to the configuration or topology of these hardware elements creating the NFV-based network. The term "deployment", when referring to software elements, such a VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of one or more VNF instances making a particular service. The terms chain optimization and service optimization may thus be used interchangeably.

The term "session" refers to a communication connection between two or more entities that persists for a period of time during which data may be exchanged there between. A session may be implemented and managed by a session layer in the corresponding network protocol. The term session may include a network session and a logical session. The network session may be associated with the devices used to communicate, while the logical session may be associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs) but may also apply to a single VNF (or the functionality provided by the VNF). The term "continuity" indicates that the session or the service is not interrupted, or that an interruption is short enough that a user is not aware of such interruption, or that the interruption does not cause any loss of data, or that the loss is handled in acceptable manner (e.g. a few packets of speech lost, but the conversation can continue, etc.).

The term "availability" or "service availability" refers to a level of the service, or a characteristic of the service, in which the service provider should provide the service, albeit possible hardware or software faults. For example, the service provider may obligate to the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a fault, whether caused by a hardware malfunction, a system crash, a software bug or a security breach or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breech or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply, but is not limited to, hardware, software, data and/or content.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

The principles and operation of a system, method, and computer program product for routing traffic to a service in a network including at least one virtual network service according to various embodiments may be further understood with reference to the following drawings and accompanying description.

Figure 2:
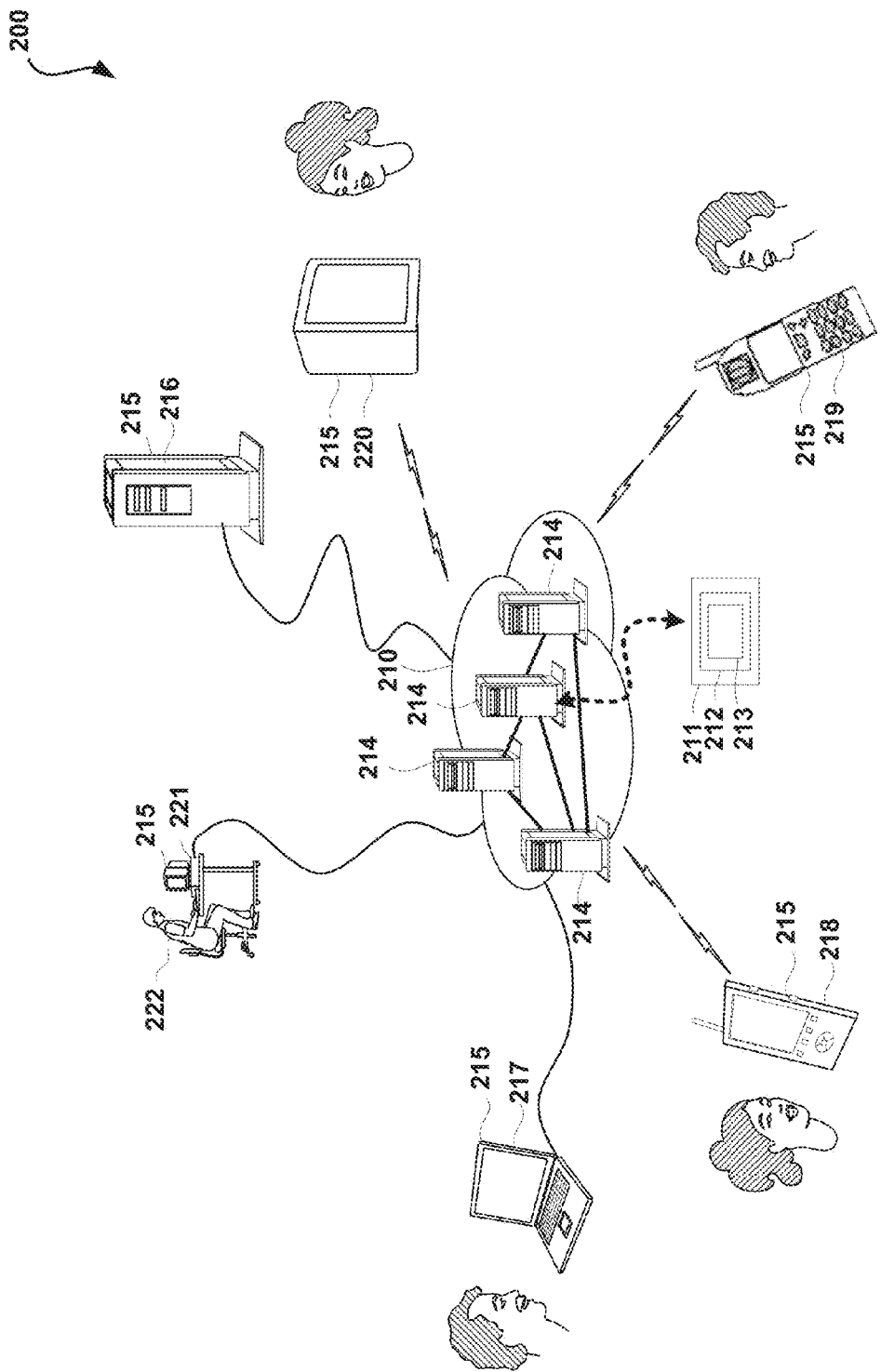
FIG. 2 illustrates a simplified diagram of a system associated with an NFV-based communication network, in accordance with one embodiment.

FIG. 2 illustrates a simplified diagram of a system 200 associated with an NFV-based communication network 210, in accordance with one embodiment. As an option, the system 200 may be implemented in the context of the details of FIG. 1. Of course, however, system 200 may be implemented in the context of any desired environment. Further, the aforementioned definitions may equally apply to the description below.

As shown in FIG. 2, at least one NFV-based network 210 is provided. The NFV-based communication network 210 includes an NFV management system 2111, an NFV-orchestration (NFV-O) module 212, and a service specific manager module 213, according to one embodiment.

In the context of the present network architecture, the NFV-based network 210 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based networks 210 may be provided.

The NFV-based network 210 may include one or more computation facilities 214, each including one or more hardware units and being interconnected by communication links to form the NFV-based network 210. At least one of the computation facilities 214 may include the NFV management system 211. The NFV management system 211 may include the NFV-O module 212 and the service specific manager module 213.

The NFV-O module 212 may be executed by one or more processors, or servers, such as computation facilities 214, of the NFV-based network 210. The NFV-O module 212 may be executed as an NFV-O instance or component. The NFV-O module 212 may therefore include a plurality of NFV-O instances or components as will be further explained below.

The service specific manager module 213 may be a part or a component of the NFV-O module 212. However, the service specific manager module 213, the NFV-O module 212 and the NFV management system 211 may be separate software programs provided by different vendors. In one embodiment, the NFV-based network 210 may even have a plurality of any of the NFV management systems 211, the NFV-O modules 212, and/or the service specific manager module 213.

A plurality of devices 215 are communicatively coupled to the NFV-based network 210. For example, a server computer 216 and a computer or terminal 217 may be coupled to the NFV-based network 210 for communication purposes. Such end-user computer or terminal 217 may include a desktop computer, a lap-top computer, a tablet computer, and/or any other type of logic or data processing device. Still yet, various other devices may be coupled to the NFV-based network 210 including a personal digital assistant (PDA) device 218, a mobile phone device 219, a television 220 (e.g. cable, aerial, mobile, or satellite television, etc.)2, etc. These devices 215 may be owned and/or operated by end-users, subscribers and/or customers of the NFV-based network 210. Others of the devices 215, such as administration station 221, may be owned and/or operated by the operator of the NFV-based network 210.

A network administrator 222 may supervise at least some aspects of the operation of the NFV-based network 210 by controlling an NFV infrastructure including the NFV management system 211, the NFV-O 212, and the service specific manager module 213.

Figure 3:
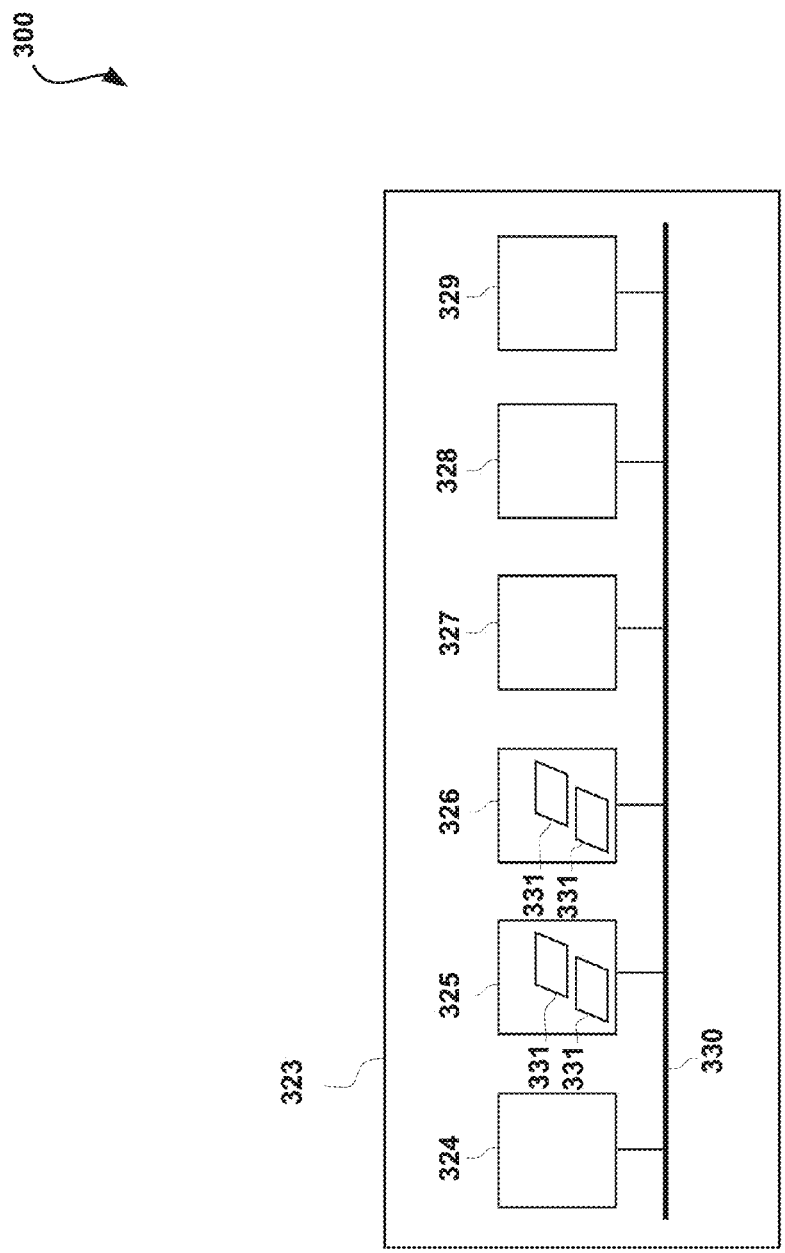
FIG. 3 illustrates a simplified block diagram of a hardware unit of an NFV-based network, in accordance with one embodiment.

FIG. 3 illustrates a simplified block diagram 300 of a hardware unit 323 of an NFV-based network, in accordance with one embodiment. As an option, the block diagram 300 may be viewed in the context of the details of the previous Figures. Of course, however, block diagram 300 may be viewed in the context of any desired environment. Further, the aforementioned definitions may equally apply to the description below.

In one embodiment, the hardware unit 323 may represent a computing facility 214 of FIG. 2, or a part of a computing facility 214. The hardware unit 323 may include a computing machine. The term computing machine relates to any type or combination of computing devices, or computing-related units, including, but not limited to, a processing device, a memory device, a storage device, and/or a communication device.

The hardware unit 323 may therefore be a network server, and the computing facility 214 may be a plurality of network servers, or a data-center, including cloud-based infrastructure. As an option, the hardware unit 323 may be implemented in the context of any of the devices of the NFV-based network 210 of FIG. 2 and/or FIG. 5 and in any desired communication environment.

Each hardware unit 323 (or computing machine, computing device, computing-related unit, and/or hardware component, etc.), including each communication link between such hardware units, may be associated with one or more performance type and a respective performance rating or value, where the hardware unit and/or communication link is operative to provide the performance value. Performance types are, for example, processing power, cash memory capacity, regular memory capacity (e.g. RAM, dynamic, or volatile memory, etc.), non-volatile memory (e.g. such as flash memory, etc.) capacity, storage capacity, power, cooling, bandwidth, bitrate, latency, jitter, bit error rate, and packet loss, etc. Virtual machines may run on top of the hardware unit 323 and a VNF may be run on one or more of such virtual machines.

The hardware unit 323 may be operative to provide computing infrastructure and resources for any type and/or instance of software component executed within the NFV-based network 210 of FIG. 2. In this regard, the hardware unit 323 may be operative to process any of the processes described herein, including but not limited to, any NFV-related software component and/or process. The hardware unit 323 is operative to process virtual network functions (VNFs), VNF instances, network function virtualization orchestration (NFV-O) software, modules and functions, data center management software, and/or cloud management systems (CMS), etc.

In various embodiments, the hardware unit 323 may include at least one processor unit 324, one or more memory units 325 (e.g. random access memory (RAM), a non-volatile memory such as a Flash memory, etc.), one or more storage units 326 (e.g. including a hard disk drive and/or a removable storage drive, representing a floppy disk drive, a magnetic tape drive, a compact disk drive, etc.), one or more communication units 327, one or more graphic processors 328 and displays 329, and one or more communication buses 330 connecting the various units/devices.

The hardware unit 323 may also include one or more computer programs 331, or computer control logic algorithms, which may be stored in any of the memory units 325 and/or storage units 326. Such computer programs, when executed, enable the hardware unit 323 to perform various functions (e.g. as set forth in the context of FIG. 1, etc.). The memory units 325 and/or the storage units 326 and/or any other storage are possible examples of tangible computer-readable media.

It is appreciated that computer program 331 may include any of the NFV management system 211, the NFV-O 212, and/or the service specific manager module 213 of FIG. 2.

Figure 4:
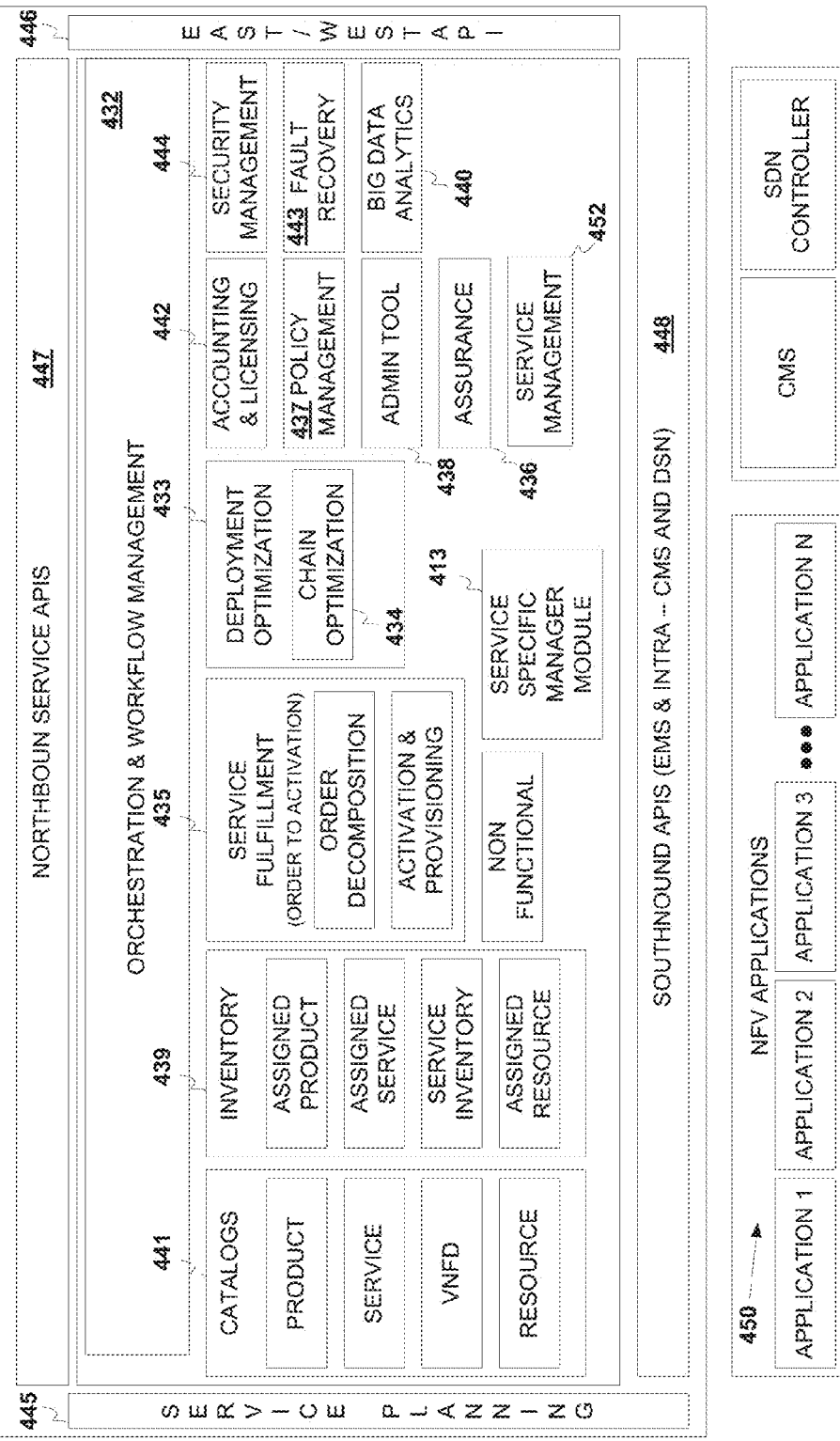
FIG. 4 illustrates a simplified diagram of an NFV management system, in accordance with one embodiment.

FIG. 4 illustrates a simplified diagram of an NFV management system 411, in accordance with one embodiment. As an option, the NFV management system 411 may be implemented in the context of the details of the previous Figures. For example, in one embodiment, the NFV management system 411 may represent the NFV management system 211 of FIG. 2. Of course, however, the NFV management system 411 may be implemented in the context of any desired environment. Further, the aforementioned definitions may equally apply to the description below.

In one embodiment, the NFV management system 411 may include an NFV-O module 412, and a service specific manager module 413. The NFV management system 411 may include one or more NFV-O modules 412. In various embodiments, each of the NFV-O modules 412 may include orchestration and workflow management 432 that is responsible for managing (i.e. orchestrating) and executing all NFV-O processes, including inbound and/or outbound communication and interfaces.

The NFV management system 411 may include a deployment optimization module 433 that enables a user to devise automatic mechanisms for network optimizations. The deployment optimization module 433 may operate these mechanisms automatically and continuously to optimize the distribution of VNFs 450 and their VNF instances in real-time (or near-real-time) by migrating VNFs 450 and VNF instances (e.g. VNF instances 551 of FIG. 5, etc.) between hardware units (e.g. hardware units 551 of FIG. 5, etc.).

The NFV management system 411 may also include a chain optimization module 434. The chain optimization module 434 may be a part of deployment optimization module 433 and may enable a user to devise automatic mechanisms for optimizing the deployment of chains or groups of VNFs 450 and VNF instances. A service provided by an NFV-based network is typically made of a particular chain or group of particular VNFs 450 and their respective VNF instances. The chain optimization module 434 optimizes the deployment of chains or groups of services between hardware units according to the requirements and specifications associated with and/or adapted to the particular service, or chain, or a group.

The chain optimization module 434 may operate these mechanisms automatically and continuously to optimize in real-time the operation of chains or groups of the VNFs 450 and their VNF instances by re-planning their distribution among hardware units and optionally also by migrating the VNFs 450 and associated VNF instances between hardware units.

The NFV management system 411 may also include a service fulfillment module 435 that manages service and resource (e.g. VNF) instance lifecycle activities as part of the process and orchestration activities. This may include on boarding, initiation (e.g. instantiation), installation and configuration, scaling, termination, software update (e.g. of a running VNF, etc.), test environment, and/or rollback procedure. Additionally, the service fulfillment module 435 may also provide decomposition of an order to multiple network services, and the activation of such network service as a single VNF instance, or as a chain of VNF instances.

Order decomposition includes translating business orders into a network oriented service implementation plan. For example, a business order may be decomposed into a plurality of functions, some of which may be provided by different software programs or modules (e.g. such as various VNFs) instantiated as a plurality of VNF instances across one or more data centers. Performing order decomposition, the service fulfillment module 435 may consult the deployment optimization module 433 for the best deployment option to customer order in a given network and resource condition. Performing order decomposition, the service fulfillment module 435 may then initiate the service including all its components. Order decomposition may be performed in several locations across an NFV-O hierarchy. For example, initial decomposition may be performed in the root of the NFV-O, and then further decomposition may be performed in the relevant data centers.

In one embodiment, an activation and provisioning module may provide the plan for activation and provisioning of the service to the orchestration and workflow management 432. The activation and provisioning module may also provide feedback on fulfillment status to an upper layer. This upper layer may include the business support services (BSS).

The NFV management system 411 may also include an assurance module 436 and a service management module 452 capable of gathering real time data on network elements' status and creating a consolidated view of services and network health. The assurance module 436 includes assurance functionality and may interact with the service management module 452 to perform assurance related lifecycle management procedures. Lifecycle management can be also triggered by other modules, policies, manual intervention, or from the VNFs themselves, etc. The assurance module 436 and the service management module 452 may also trigger events associated with lifecycle management and faults. The assurance module 436 and the service management module 452 may monitor the health of the network and may execute fault recovery activities.

The assurance module 436 and the service management module 452 provide the ability to monitor services' status and performance according to the required criteria. The assurance module 436 and the service management module 452 may also interact with the network infrastructure (e.g. including computing, storage, and networking, etc.) to receive the required information, analyze the information, and act upon each incident according to the defined policy. The assurance module 436 and the service management module 452 are able to interact with analytics to enrich a policy assurance module. Interfaces may also be provided for implementation by an external system.

The NFV management system 411 may also include a policy management module 437 that enables a user to define and configure offline and/or real-time policy for controlling VNF and service related rules. The policy management module 437 may contain the preconfigured policies and activities as well as selection rules for the NFV-O process to determine the preferred policy or activity to be performed for a particular process event. The policy management may be multi-layered, including vendor policy, service policy, and operator policy, etc. The policy mechanism may trigger the suitable policy layer (vendor/service/operator).

The NFV management system 411 may also include an administration module 438 that provides an overall view of the network, manual lifecycle management and intervention, and manual system administration and configuration. The administration module 438 may be operable to enable a user such as an administrator (e.g. administrator 222 of FIG. 2, etc.) to manage, view, and operate the NFV-O system. The administration module 438 may also provide a view of the network topology and services, the ability to perform specific activities such as manual lifecycle management, and changing service and connectivity configuration.

The NFV management system 411 may also include an inventory management module 439 that maintains a distributed view of deployed services and hardware resources. Inventory catalogues may reflect the current instantiation and allocation of the resources and services within the network mapped into products and/or customer entities.

The NFV management system 411 may also include a big data analytics module 440 that analyzes network and service data to support network decisions involving services and subscribers to improve network performance based on actual usage patterns. The big data analytics module 440 may also generate what-if scenarios to support business-oriented planning processes. Additionally, the big data analytics module 440 may function to analyze and evaluate the information for various planning aspects (e.g. Virtual Network Capacity Planning, Data Center Capacity Planning, Value based planning, Cost analysis for network deployment alternatives, etc.), deployment and management (e.g. Guided Operator Recommendations. What-if scenario analysis and simulation, application rapid elasticity and resource usage optimization, etc.), and may support business-oriented planning processes.

The NFV management system 411 may also include a catalog module 441 may include records defining various aspects of the network, such as products, services, and resources such as hardware units and VNFs (e.g. a VNF directory, etc.). The catalog module 441 may include a collection of centralized, hierarchical information repositories containing resource, service and product definitions with their relationship, versioning, and/or descriptors, etc. Such records may include templates enabling a user, such as an administrator, to define particular network components such as resources, products, services, etc. A resource template may define resources descriptors, attributes, activities, procedures, and/or connectivity, etc. A service template may define a service variation from resource building blocks. A product template may define parameters of a sellable product (e.g. prices, rating, etc.) based on service composition (e.g. in one embodiment, this may be part of a BSS catalogue).

The inventory management module 439, the big data analytics module 440, and/or the catalog module 441 may support multiple data centers, multiple CMSs and provide a centralized view across the infrastructure. The inventory management module 439, the big data analytics module 440, and/or the catalog module 441 may also support hybrid networks and services maintaining both physical and virtual resources.

The NFV management system 411 may also include an accounting and licensing module 442 that may be operable to record and manage network software usage data for commercial purposes including licensing, accounting, billing, and reconciliation of services with subscribers and providers. The accounting and licensing module 442 may manage licensing and usage of virtual network applications, including the ability to support complex rating schemes, based on various parameters such as CPU, memory, data, etc. The accounting and licensing module 442 may enable users to define the pricing of particular VNF modules and provide settlement with vendors. The accounting and licensing module 442 may also enable the evaluation of internal costs of services provided within the network for calculating return on investment (ROI).

The NFV management system 411 may also include a fault recovery module 443 (otherwise named disaster recovery planning module or DRP, etc.) that enables a user to plan and manage disaster recovery procedures for the NFV-O and/or the entire network.

The NFV management system 411 may also include a security management module 444 that provides the authentication authorization and accounting services of application security across the network. The security management module 444 may include, for example, an authentication module and function. In one embodiment, the authentication module and function (e.g. including identity management, etc.) may authenticate the identity of each user defined in the system. Each user may have a unique user identity and password. The system may support password based authentication with flexible password policy. Integration with external authentication providers may be done via additional system enhancements. The authorization module and function may support a role-based access control (RBAC) mechanism, where each user is assigned with one or more roles according to the business needs based on the least privileges concept (e.g. standard or administrator roles). In one embodiment, the accounting and licensing module 442 may provide an audit of security events such as authentication or login events.

As an option, the security management module 444 may use rules to protect sensitive information. For example, such rules may be used to ensure the data accessed is used for the specific purposes for which it was collected, sensitive information is encrypted when in storage/transit and masked/truncated on display and logs, and that the entire security system is deployed in the customer's intranet network (i.e. behind network/infrastructure measures), in an independent domain, etc.

In one embodiment, the NFV management system 411 may further include a Secure Development Life Cycle (SDLC) module that ensures that security aspects are handled during a project's life cycle, such as security design, security testing, etc.

As shown further in FIG. 4, the NFV management system 411 may include a service planning module 445. The service planning module 445 may be used by a communication service provider (CSP) sales representative, enterprise, and/or technician, as part of selling engagement process with enterprise/SMB customers.

The service planning module 445 may also provide the ability to interact with catalogues, customer data, network and ordering systems to provide online network service proposals for the enterprise customers with ability to quote update the proposal, validate the serviceability and network inventory, and once done, provide the service order for activation using the northbound interface.

The service specific manager module 413 may also be part of the NFV-O module 412. The service specific manager module 413 to implement the functionality described in the context of FIG. 1 (e.g. some or all of the operations associated with method 100).

The NFV management system 411 may also include east/west APIs 446 that include various domains/activities interfaces, including an information source to a big data repository, and interaction capability with a physical network system (OSS).

Northbound APIs 447 provides application programming interfaces (APIs) to various external software packages, such as business support system (BSS) for service order fulfillment, cancel and update activities, status notification, resource inventory view, monitoring system, assurance system, service planning tool, administration tool for system view and configuration, and big data repository, etc.

Further, the southbound APIs 448 may provide APIs for external software packages, such as CMS (including service and VNFs lifecycle activities—receiving from the infrastructure status and monitoring information for upstream system and activities [e.g. assurance]), an SDN Controller (or other connectivity system) to configure inter and intra data center connectivity, an EMS to configure the VNF, and a VNF for a direct configuration.

Figure 5:
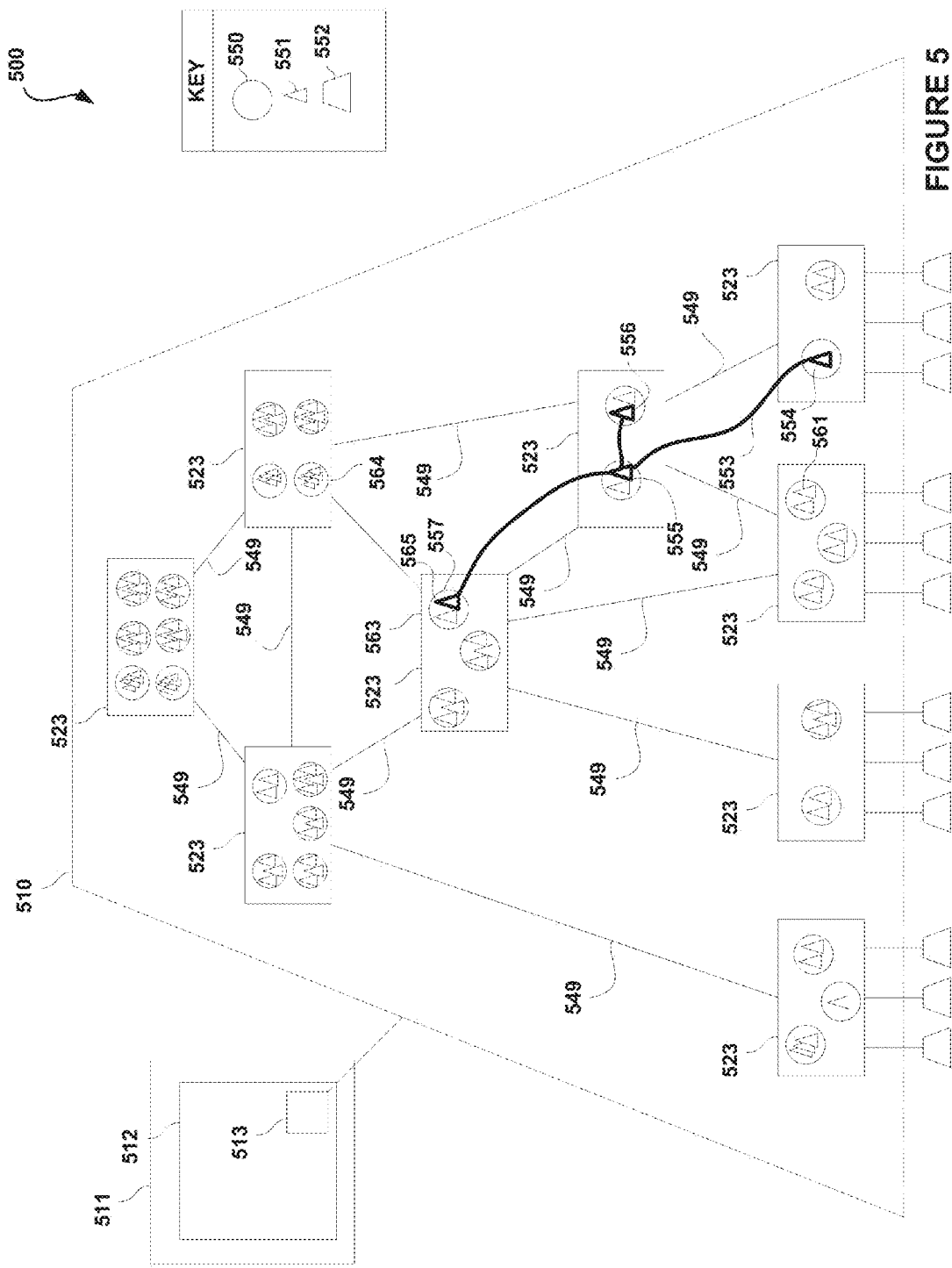
FIG. 5 illustrates a simplified diagram of a deployed NFV-based network, in accordance with one embodiment.

FIG. 5 illustrates a simplified diagram 500 of a deployed NFV-based network 510, in accordance with one embodiment. As an option, the diagram 500 may be viewed in the context of the details of the previous Figures. For example, in one embodiment, the deployed NFV-based network 510 and associated elements may represent the NFV-based networks and associated elements described in the context of the previous Figures. Of course, however, the diagram 500 may be viewed in the context of any desired environment. Further, the aforementioned definitions may equally apply to the description below.

As shown in FIG. 5, the NFV-based network 510 may include hardware units 523 connected via transmission lines 549, and VNFs implemented as software programs 550 installed in hardware units 523. Some of the hardware units 523 may be directly connected to a customer. The customer may be a subscriber, an end-user, or an organization, represented herein as a terminal or a server 552, or a plurality of terminals and/or servers 552. The NFV-based network 510 may also include a NFV management system 511, an NFV-orchestration (NFV-O) 512, and a service specific manager module 513 (which may all represent elements described in the context of the previous figures, etc.).

As shown further in FIG. 5, several, typically different, VNFs 550 may be installed in the same hardware unit 523. Additionally, the same VNF 550 may be installed in different hardware units 523.

A VNF 550 may be executed by a processor of the hardware unit 523 in the form of a VNF instance 551. Therefore, a particular VNF 550 installed in a particular hardware unit 523 may be "incarnated" in (e.g. initiated, executed as, etc.) any number of VNF instances 551. The VNF instances 551 may be independent of each other. Additionally, each VNF instance 551 may serve different terminals and/or servers 552. The NFV-based network 510 connects to and between communication terminal devices 552 that may be operated by one or more customers, subscribers, and/or end-users.

It is appreciated that a network operator may manage one or more services deployed in the customer's premises. Therefore, some of the hardware units 523 may reside within the premises of the network operator, while other hardware units 523 may reside in the customer's premises. Similarly, a server, such as server computer 216 of FIG. 2, may reside in the premises of the network operator or in the customer's premises. Consequently, when the network operator provides and/or manages one or more services for a customer's terminal devices 552 such as a server computer, the NFV-based network 510 of the network operator may directly manage the VNFs 550, providing the services and their VNF instances 551.

In such situation, the NFV-based network 510 may manage the services irrespectively of the location of the terminal devices 552 (e.g. the server computer 216, etc.), whether in the premises of the network operator or in the customer's premises. In other words, the NFV-based network 510 may be managing the VNFs 550 and the VNF instances 551 providing the services, as well as the terminal devices 552 (e.g. the server computer 216, etc.) being co-located within the same computing device (e.g. the hardware unit 523, etc.), whether in the premises of the network operator or in the customer's premises or in a commercial cloud or any other place.

A service provided by the communication network may be implemented using one or more VNFs. For example, the service may be a group, or a chain of interconnected VNFs. The VNFs making the group, or the service, may be installed and executed by a single processor, by several processors on the same rack, within several racks in the same data-center, or by processors distributed within two or more data-centers. In some cases, chain optimization may be employed by optimizing the deployment of a service in a communication network using network function virtualization, and to optimizing the deployment of a group, or a chain, of virtual network functions in the NFV-based network 510. Therefore, the term "chain optimization" refers to the planning and/or managing of the deployment of VNFs making a chain, or a group, of VNFs providing a particular service.

For example, FIG. 5 shows a first service 553, including the VNFs 550 and their respective VNF instances 554, 555, 556, and 557, and a thick line. In this example, the group or chain of the VNFs 550 making first service 553 are connected as a chain of VNFs 550. However, the VNFs 550 making a service may be connected in any conceivable form such as a star, tree-root, tree-branch, mesh, etc., including combinations thereof. It is noted that the VNFs 550 may be executed by two or more VNF instances 551, such as VNF 554.

The deployment of the group or chain of the VNFs 550 making the first service 553 is therefore limited by constraints such as the capacity of the communication link 549 bandwidth and/or latency (delay).

A VNF may have a list of requirements, or specifications, such as processing power, cash memory capacity, regular memory capacity (e.g. RAM, dynamic, or volatile memory, etc.), non-volatile memory (e.g. such as flash memory, etc.) capacity, storage capacity, power requirements, cooling requirements, etc. A particular VNF instance 551 providing a particular function (e.g. to a particular customer, entity, etc.) may have further requirements, or modified requirements, for example, associated with a particular quality of service (QoS) or service level agreement (SLA). Such requirements may include maximum latency or delay, average latency and maximum variance (latency jitter), maximal allowed packet loss, etc. Other requirements may include service availability, redundancy, backup, provisions for rollback and/or recovery, fault-tolerance, and/or fail-safe operation, etc.

A service made of a chain or a group of VNFs 550 and their VNF instances 551 may have a similar list of requirements, or specifications, covering the service as a whole. Therefore, such requirements, or specifications, may imply, affect, or include, requirements, or specifications, regarding communication links between the VNFs 550 and/or the VNF instances 551. Such requirements, or specifications, may include bandwidth, latency, bit-error rate, and/or packet loss, etc. Such communication requirements or specifications may further impose deployment limitations, or constraints, requiring particular VNFs 550 and/or VNF instances 551 to reside in the same data-center, or within the same rack, or even in the same computing device, for example, sharing memory or being executed by the same processor. Security measures may add further requirements, or specifications, such as co-location of some of the VNFs 550 and/or the VNF instances 551.

In the context of FIG. 5, the NFV-based network 510 has a hierarchical structure. There may be at least four aspects of the hierarchical structure of the NFV-based network 510. The networking or traffic aspect refers to the arrangement of the transmission lines between the hardware units 523. The processing aspect refers to the arrangement of the hardware units 523. The software aspect refers to the arrangement of the VNFs 550. The operational aspect refers to the arrangement of the VNF instances 551.

One aspect of the optimization process in an NFV-based network is that it may be based on real-time needs, rather than long-term, statistically anticipated, needs. One potential limitation on network reconfiguration in NFV-based networks is that network configuration does not result in a deterioration beyond acceptable level of any of the current services. The NFV deployment module (e.g. module 433 of FIG. 4, etc.) may function to enable and manage migration of services between the hardware units 523, the VNFs 550, and the VNF instances 551 in real-time, without affecting or with a minimal effect on the availability of a service, and while securing service and session continuity.

In the context of the current description, the term "continuous" means that the deployment optimization module and/or a chain optimization module (e.g. the chain optimization module 434 of FIG. 4, etc.) performs the relevant optimization task or process in run-time, or real-time, or online, or on-the-fly, or repetitively and without adversely affecting the network's functionality and its services.

Unlike a legacy network, the NFV-based network may have two topologies: the topology of the hardware devices, and the topology of the VNFs (the distribution of VNFs among the hardware devices). The topology of the hardware network is relatively stable, while the VNF topology can be optimized in real-time. Another benefit of the NFV-based network is that modifying the software topology (e.g. the distribution of VNFs among the hardware devices) is much less costly than any modification of the hardware topology. However, any modification of the network has its cost, including the cost of making such modification possible. Added cost may result from the need to process the modification of the topology and the re-distribution of VNF instances and to maintain excess resources for such purpose.

Thus, in some cases, it may be desired to localize the NFV-O 512, and particularly the deployment optimization processes associated with the deployment optimization module and the chain optimization module to reduce the cost, and simultaneously to secure the possibility to expand the scope of the network managed by these processes, if needed.

Figure 6:
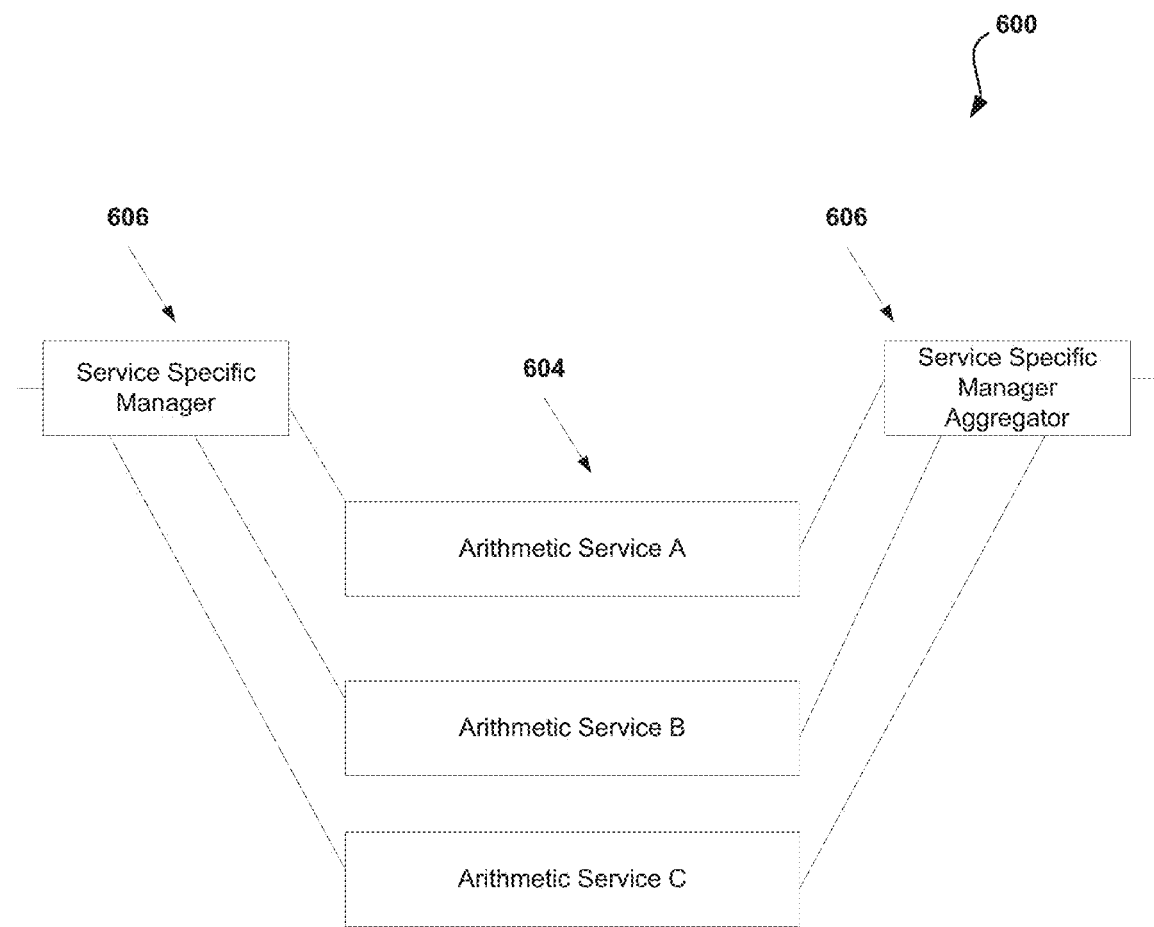
FIG. 6 illustrates a system for routing traffic to a service in a network including at least one virtual network service, in accordance with one embodiment.

FIG. 6 illustrates a system 600 for routing traffic to a service in a network including at least one virtual network service, in accordance with one embodiment. As an option, the system 600 may be implemented in the context of the details of the previous Figures. Of course, however, system 600 may be implemented in the context of any desired environment. Further, the aforementioned definitions may equally apply to the description below.

As shown, the system 600 includes a service specific manager module 602, a service specific manager aggregator 606, and a plurality of services/components 604. In operation, the service specific manager module 602 may receive traffic directed to a component, analyze the traffic, and route the traffic to a component/service 604 based on the analyzed traffic. Such techniques may be used in the context of traffic management in NFV-based networks, etc.

With the use of network function virtualization orchestration (NFV-O) and various NFV managers, there will be many competing companies selling compatible services. A customer could buy a virtual service (e.g. a firewall, etc.) from any number of companies. In addition, the customer may already have a physical component that performs this service.

Currently, even if the customer has multiple services that are compatible, the decision of which services to use is independent of the data. For example, the policy could be to use the physical service up to some threshold, then use one service on one cloud, and then another service on another cloud. Thus, currently, the main reason to use multiple services is to be able to supply the demand when one service is overwhelmed. The current decision on which service to use, when a number of services are available, is independent of the data.

It is often the case that a service provides multiple functionalities. It is likely then, when comparing alternative service implementations by different vendors, one service may be better on some functionalities and another service may be better on different functionality. This understanding of the relative merits of different services is currently not factored into choosing which service to use for specific requests.

For example, if a customer has two firewalls and one firewall has more up to date knowledge on traffic related to Europe and the other firewall has more up to date knowledge on traffic related to China, it is currently not the case that a service will examine the data and then decide which service to use.

Another example is that one firewall service has a very efficient implementation of http and another of ftp. Thus, http traffic should be sent to one service and ftp to another service.

The reason the inspection should be service specific is because it is desirable to determine how this specific data will be handled by specific services. Criteria such as cost, CPU, traffic, jitter, SLA and other criteria should be considered.

Accordingly, in one embodiment, the service specific manager 202 may include an internal table that shows, for each data type as analyzed, the different cost attributes of the different services. In one embodiment, from this internal table, a routing table may be created. Without implementing the techniques discussed herein, a specific service would be chosen without analyzing the data.

For example, input data may include possibilities such as a request for factoring (very heavy computationally), finding roots of polynomial (semi heavy), or moving from metrics to fit (very simple). The request may include both the type of request and the data itself.

For this example, utilizing the system 600, the service specific manager 602 may receive the request and inspect the packet. The service specific manager 602, according to the content, may decide to which arithmetic service 604 to send the data (e.g. A, B, or C). Each of the services may be physical, virtual, local, remote or on a cloud, and any combination thereof (local physical, cloud virtual, remote physical, etc.).

In this example, there may be five categories of input of interest, long numbers that need to be factored, short numbers that need to be factored, large polynomials, small polynomials, and metric conversions.

One example of a solution is to use a routing table where, after analyzing the input, it is decided which service to use. As an example, the table may be similar to Table 1.

TABLE 1

| Input type | Service chosen |
|---|---|
| Long number to be factored | A |
| Short number to be factored | B |
| Long polynomial | B |
| Short Polynomial | B |
| Conversion metrics | C |

For this specific case, it can be seen that the analysis of the length of the polynomial is not required, so a simpler table may be used, as depicted by Table 2.

TABLE 2

| Input type | Service chosen |
|---|---|
| Long number to be factored | A |
| Short number to be factored | B |
| Polynomial | B |
| Conversion metrics | C |

This means, of course, not only a simpler table may be used but also simpler analysis. Deriving the table may be accomplished with the specific service in mind by either analyzing the behavior of the different alternative services with respect to different data requests or by querying the service provider as to the service characteristic. The decision may not be based on any specific factor but on a weighted combination. In the example above, service A may be the most efficient but it may be remote and the communication cost may be high. Thus, as long as there is not a lot of CPU cost, B and C may be preferred over A.

One of the parameters for making the choice is cost. Different services may reside on different clouds, which can change their cost during the day. Preference may change as the importance of performance may change at peak time. In order to calculate the routing table used by the service specific manager, in one embodiment, a different cost table may be used, which as an example is shown in Table 3.

TABLE 3

| Input type | Service A | Service B | Service C |
|---|---|---|---|
| Long number to be factored | $ cost per unit, CPU time, Traffic, SLA, Jitter | | |
| Short number to be factored | | | |
| Long polynomial | | | |
| Short Polynomial | | | |
| Conversion metrics | | | |

The table may be static with respect to most parameters, as those may be properties of the service which do not change. However, the cloud may decide on different costs, in which case if the service resides on that cloud, the cost may change. The decision of which service is preferable for a specific input type may depend on the evaluation of all factors and may change with time depending on system requirements.

In various embodiments, this internal table may not be used on every packet and may only be used to calculate the routing table. Additionally, the internal table may make different choice depending on the utilization of a system.

Figure 7:
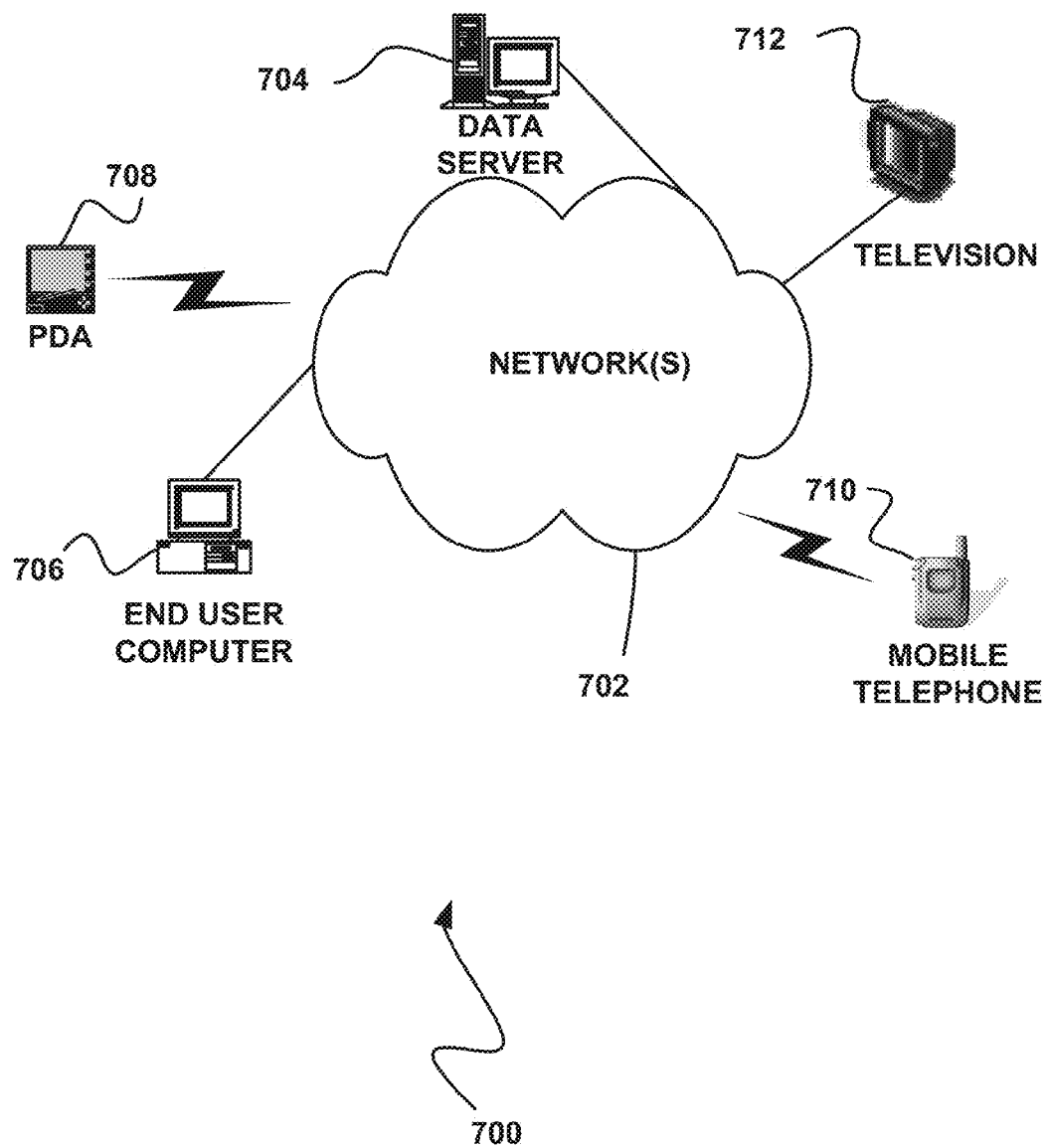
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
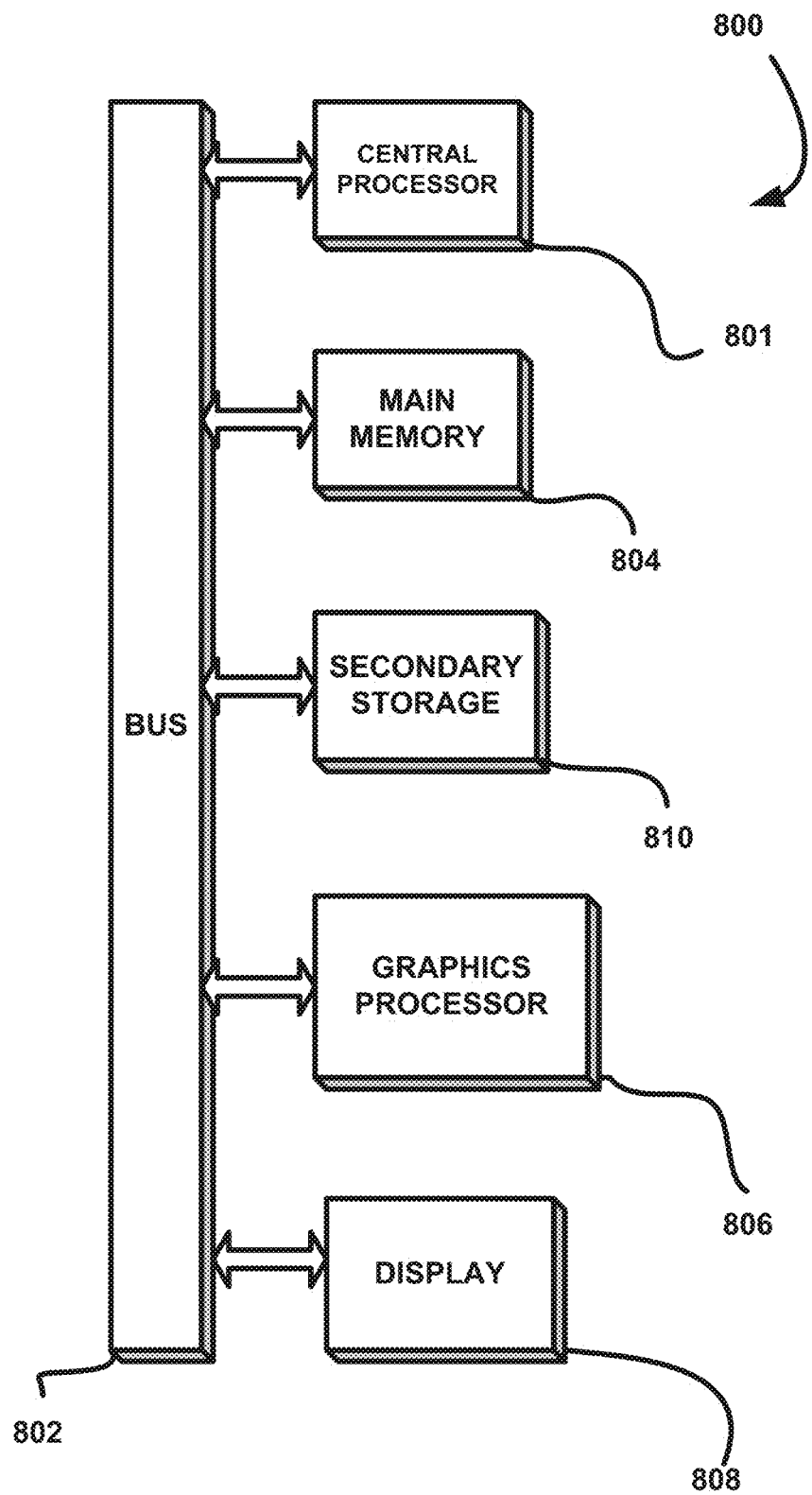
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    storing, by a network function virtualization (NFV) based network system, a routing table that correlates each of a plurality of components in the NFV based network system to one of a plurality of types of data traffic capable of being handled by the component, the plurality of components in the NFV based network system including physical network services and virtual network services, wherein the routing table is generated by:
        for each type of data traffic of the plurality of types of data traffic, determining each component of the plurality of components in the NFV based network system that is capable of handling the type of data traffic,
        for each type of data traffic of the plurality of types of data traffic, selecting one of the components determined to be capable of handling the type of data traffic based on a plurality of factors;
    receiving, by a virtual network function (VNF) of the NFV based network system, data traffic directed to at least one first component of the plurality of components in the NFV based network system, the at least one first component being one of the physical network services or one of the virtual network services;
    analyzing, by the VNF, the received data traffic to identify information associated with the received data traffic, the information indicating one of the plurality of types of data traffic that comprises the received data traffic;
    determining, by the VNF using the routing table, a second component of the plurality of components in the NFV based network system that is correlated with, and thus capable of handling, the type of the received data traffic, the second component including one of the virtual network services or one of the physical network services;
    sending, by the VNF, the data traffic to the determined second component for handling thereof.

2. The method of claim 1, wherein the at least one first component is one of the physical network services.

3. The method of claim 1, wherein the at least one first component is one of the virtual network services.

4. The method of claim 1, wherein the second component is one of the virtual network services.

5. The method of claim 1, wherein the plurality of factors includes a monetary cost.

6. The method of claim 1, wherein the plurality of factors includes at least one of: a location of the component, a processing cost, a service level agreement, a cost of the component, and a jitter associated with the component.

7. The method of claim 1, wherein the plurality of factors are weighted for selecting the one of the components determined to be capable of handling the type of data traffic.

8. The method of claim 1, wherein a cost table is utilized to generate the routing table.

9. The method of claim 1, wherein the one of the components determined to be capable of handling the type of data traffic is selected responsive to determining that the component has a lowest cost.

10. The method of claim 9, wherein the lowest cost is determined based on at least one of a location of the component, a processing cost for handling the data traffic, a service level agreement associated with the component, a cost of the component, and a jitter associated with the component.

11. The method of claim 1, wherein the at least one first component includes at least one other VNF.

12. The method of claim 1, wherein the routing table is generated using a cost table, and wherein the cost table stores, for each of the plurality of components, values of the plurality of factors.

13. The method of claim 12, wherein the plurality of factors include cost and processing time.

14. The method of claim 1, wherein the plurality of types of data traffic each include a different geographical source location of the data traffic, wherein the plurality of components each include a firewall, and wherein the plurality of factors include, for each of the different geographical source locations, which of the firewalls has a most up to date knowledge for handling the data traffic therefrom.

15. The method of claim 1, wherein the plurality of types of data traffic each include a different network protocol, wherein the plurality of factors include, for each of the different network protocols, which of the components has a most efficient implementation of the network protocol.

16. The method of claim 1, wherein, for each of the plurality of components, values of the plurality of factors are determined by analyzing the component with respect to different data requests.

17. The method of claim 1, wherein, for each of the plurality of components, values of the plurality of factors are determined by querying a provider of the component for characteristics of the component.

18. The method of claim 1, wherein a first portion of the plurality of factors are static and include properties of the component that do not change, and wherein a second portion of the plurality of factors have values that change over time, such that the one of the components that is selected based on the plurality of factors may change over time.

19. A non-transitory computer readable medium storing computer code executable by a processor to perform a method, comprising:
    storing, by a network function virtualization (NFV) based network system, a routing table that correlates each of a plurality of components in the NFV based network system to one of a plurality of types of data traffic capable of being handled by the component, the plurality of components in the NFV based network system including physical network services and virtual network services, wherein the routing table is generated by:
        for each type of data traffic of the plurality of types of data traffic, determining each component of the plurality of components in the NFV based network system that is capable of handling the type of data traffic,
        for each type of data traffic of the plurality of types of data traffic, selecting one of the components determined to be capable of handling the type of data traffic based on a plurality of factors;
    receiving, by a virtual network function (VNF) of the NFV based network system, data traffic directed to at least one first component of the plurality of components in the NFV based network system, the at least one first component being one of the physical network services or one of the virtual network services;

analyzing, by the VNF, the received data traffic to identify information associated with the received data traffic, the information indicating one of the plurality of types of data traffic that comprises the received data traffic;

determining, by the VNF using the routing table, a second component of the plurality of components in the NFV based network system that is correlated with, and thus capable of handling, the type of the received data traffic, the second component including one of the virtual network services or one of the physical network services;

sending, by the VNF, the data traffic to the determined second component for handling thereof.

20. A network function virtualization (NFV) based network system comprising:

a memory system; and one or more processing cores coupled to the memory system and that are each configured to:

store a routing table that correlates each of a plurality of components in the NFV based network system to one of a plurality of types of data traffic capable of being handled by the component, the plurality of components in the NFV based network system including physical network services and virtual network services, wherein the routing table is generated by:

for each type of data traffic of the plurality of types of data traffic, determining each component of the plurality of components in the NFV based system that is capable of handling the type of data traffic, for each type of data traffic of the plurality of types of data traffic, selecting one of the components determined to be capable of handling the type of data traffic based on a plurality of factors;

receive, by a virtual network function (VNF) of the NFV based network system, data traffic directed to at least one first component of the plurality of components in the NFV based network system, the at least one first component being one of the physical network services or one of the virtual network services;

analyze, by the VNF, the received data traffic to identify information associated with the received data traffic, the information indicating one of the plurality of types of data traffic that comprises the received data traffic;

determine, by the VNF using the routing table, a second component of the plurality of components in the NFV based network system that is correlated with, and thus capable of handling, the type of the received data traffic, the second component including one of the virtual network services or one of the physical network services;

send, by the VNF, the data traffic to the determined second component for handling thereof.

* * * * *